US012040539B2

(12) United States Patent
Andreu et al.

(10) Patent No.: US 12,040,539 B2
(45) Date of Patent: Jul. 16, 2024

(54) MITIGATION OF RIPPLE IN ELEMENT PATTERN OF GEODESIC ANTENNA

(71) Applicant: Raytheon Company, Waltham, MA (US)

(72) Inventors: Allen J. Andreu, Tampa, FL (US); Carlos R. Costas, Brandon, FL (US); James W. Culver, Seminole, FL (US); Daniel P. Jones, Pinellas Park, FL (US); Ryan C. Lewandowski, Palm Harbor, FL (US)

(73) Assignee: Raytheon Company, Tewksbury, MA (US)

( * ) Notice: Subject to any disclaimer, the term of this patent is extended or adjusted under 35 U.S.C. 154(b) by 368 days.

(21) Appl. No.: 17/105,099

(22) Filed: Nov. 25, 2020

(65) Prior Publication Data

US 2022/0166130 A1 May 26, 2022

(51) Int. Cl.
*H01Q 1/36* (2006.01)
*H01Q 3/26* (2006.01)
*H01Q 13/04* (2006.01)
*H01Q 15/04* (2006.01)

(52) U.S. Cl.
CPC ............. *H01Q 1/36* (2013.01); *H01Q 3/2611* (2013.01); *H01Q 15/04* (2013.01)

(58) Field of Classification Search
CPC ............ H01Q 1/36; H01Q 15/04; H01Q 3/26; H01Q 3/2611; H01Q 13/02; H01Q 13/12; H01Q 13/04; H01Q 21/205
See application file for complete search history.

(56) References Cited

U.S. PATENT DOCUMENTS

| | | | | |
|---|---|---|---|---|
| 3,255,451 A * | 6/1966 | Wolcott | H01Q 3/14 343/753 |
| 3,755,815 A * | 8/1973 | Stangel | H01Q 3/46 343/754 |
| 5,019,832 A | 5/1991 | Ekdahl | |
| 5,106,594 A | 4/1992 | Held et al. | |
| 5,543,111 A | 8/1996 | Bridges et al. | |

(Continued)

FOREIGN PATENT DOCUMENTS

| | | | |
|---|---|---|---|
| GB | 1505375 A * | 3/1978 | H01Q 13/04 |
| JP | 2010-529795 A | 8/2010 | |

OTHER PUBLICATIONS

Brian S. Cramer, date: Mar. 1, 2984, "Geodesic Cone Antenna," Lockheed Electronics Company, Inc., Plainfield, New Jersey, 25 pages. (Year: 1984).*

(Continued)

*Primary Examiner* — Thai Pham

(57) ABSTRACT

An apparatus for mitigating element pattern ripple includes an inner cone, an outer cone, at least one driven element, and at least one director. The outer cone is coupled to the inner cone. The at least one driving element is coupled to the outer cone and is configured to produce at least one primary ray. The at least one director is coupled to the outer cone and is configured to direct the at least one primary ray. The inner cone and the outer cone may be concentric. The at least one driven element may include multiple driven elements. The at least one director may include multiple directors. A number of directors may be equal to a number of driven elements.

24 Claims, 5 Drawing Sheets

(56) References Cited

U.S. PATENT DOCUMENTS

| | | | | |
|---|---|---|---|---|
| 5,923,299 | A | 7/1999 | Brown et al. | |
| 5,980,824 | A | 11/1999 | Kartchner | |
| 6,011,520 | A * | 1/2000 | Howell | H01Q 21/205 343/768 |
| 8,279,604 | B2 | 10/2012 | Jones et al. | |
| 9,219,309 | B2 | 12/2015 | Costas et al. | |
| 2002/0158798 | A1 * | 10/2002 | Chiang | H01Q 9/32 342/372 |
| 2006/0024195 | A1 | 2/2006 | Lagunas-Solar et al. | |
| 2014/0022126 | A1 * | 1/2014 | Costas | H01Q 3/26 343/754 |
| 2018/0170392 | A1 * | 6/2018 | Yang | G01C 21/3679 |

OTHER PUBLICATIONS

"A new class of 360 degree scanning antenna—The geolenray antenna", 1967 Antennas and Propagation Society International Symposium, Oct. 17, 1967, pp. 19-26, XP055888856; DOI: 10.1109/APS.1967.1150526 (Year: 1967).*

Andreu et al., "Modified Ground Planes To Increase Gains in Element Patterns of Geodesic Antennas", U.S. Appl. No. 17/110,020, filed Dec. 2, 2020, 34 pages.

Yean, "Analysis and Design of a Wideband Multibeam Array," A thesis submitted for the degree of PH.D. of Engineering, Department of Electrical and Computer Engineering, National University of Singapore, 2010, 147 pages.

Hacking, "A New Class of 360 Degree Scanning Antenna—The Geolenray Antenna," 1967 Antennas and Propagation Society International Symposium, Electromagnetic Techniques Laboratory, Stanford Research Institute, Melo Park, California, Oct. 17-19, 7 pages.

Cramer, "Geodesic Cone Antenna," Lockheed Electronics Company, Inc., Plainfield, New Jersey, 25 pages.

International Search Report and Written Opinion of the International Searching Authority dated Feb. 28, 2022 in connection with International Patent Application No. PCT/US2021/056463, 10 pages.

Notice of Reasons for Refusal dated Apr. 16, 2024 in connection with Japanese Patent Application No. 2023-531512, 10 pages.

Request for the Submission of an Opinion dated May 2, 2024 in connection with Korean Patent Application No. 10-2022-7015207, 12 pages.

* cited by examiner

| NAME | X | Y |
|---|---|---|
| m1 | -22.0000 | 10.3452 |
| m2 | 113.0000 | -0.3105 |
| m3 | -162.0000 | 0.7382 |
| m4 | 57.0000 | -0.3916 |

| NAME | X | Y |
|---|---|---|
| m1 | -22.0000 | 10.8145 |
| m2 | 155.0000 | -1.6060 |
| m3 | -104.0000 | -3.9206 |
| m4 | 58.0000 | -3.5462 |

MITIGATION OF RIPPLE IN ELEMENT PATTERN OF GEODESIC ANTENNA

TECHNICAL FIELD

This disclosure is generally directed to geodesic antennas. More specifically, this disclosure is directed to mitigation of ripple in an element pattern of a geodesic antenna.

BACKGROUND

Geodesic antennas are antennas in which antenna elements contribute to beam patterns in all degrees in azimuth. However, one issue that geodesic antennas face is ripple in phase that occurs from energy wrapping around cones of the geodesic antennas, which causes destructive interference with the beam patterns.

SUMMARY

This disclosure provides mitigation of ripple in an element pattern of a geodesic antenna.

In a first embodiment, an apparatus for mitigating ripple includes an inner cone, an outer cone, at least one driven element, and at least one director. The outer cone is coupled to the inner cone. The at least one driving element is coupled to the outer cone and is configured to produce at least one primary ray. The at least one director is coupled to the outer cone and is configured to direct the at least one primary ray.

In a second embodiment, an apparatus for mitigating ripple includes an inner cone, a first outer cone, a second outer cone, at least one driven element, and at least one director. The first outer cone is coupled to the inner cone, and the second outer cone is coupled to the first outer cone. The at least one driving element is coupled to the second outer cone and is configured to produce at least one primary ray. The at least one director is coupled to the second outer cone and is configured to direct the at least one primary ray.

In a third embodiment, an apparatus for mitigating ripple includes an inner cone, a first outer cone, at least one first driven element, at least one first director, a second outer cone, at least one second driven element, and at least one second director. The first outer cone is coupled to the inner cone. The at least one first driving element is coupled to the first outer cone and is configured to produce at least one first primary ray. The at least one first director is coupled to the first outer cone and is configured to direct the at least one first primary ray. The second outer cone is coupled to the first outer cone. The at least one second driving element is coupled to the second outer cone and is configured to produce at least one second primary ray. The at least one second director is coupled to the second outer cone and is configured to direct the at least one second primary ray.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 6, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1:
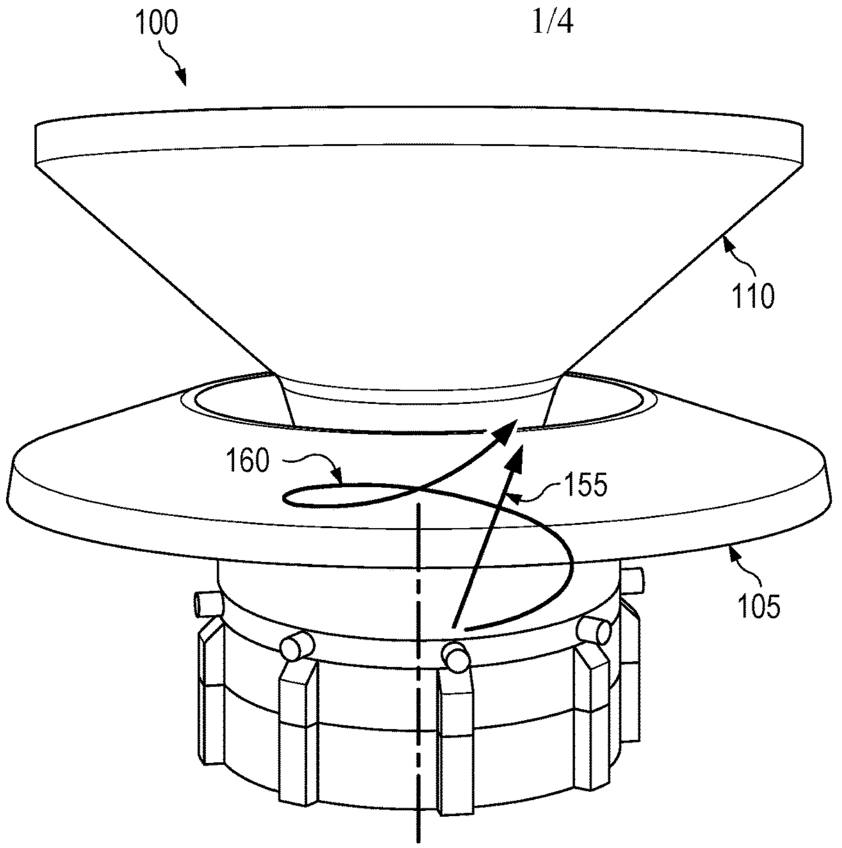
FIG. 1 illustrate an example geodesic antenna in accordance with this disclosure.
Figure 2:
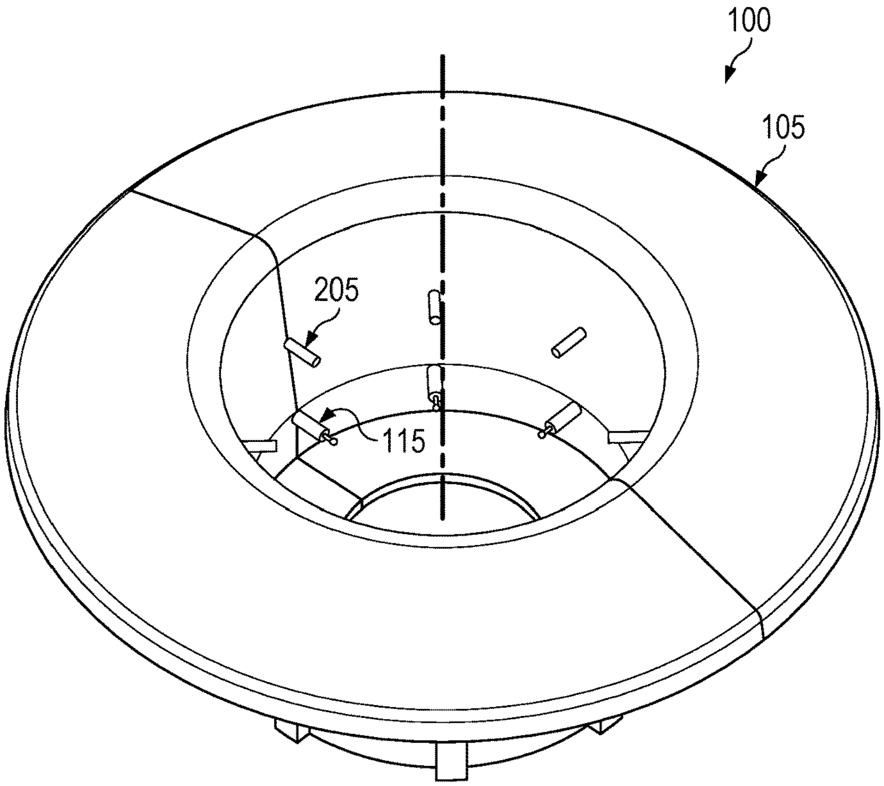
FIG. 2 illustrate an example outer cone in a geodesic antenna with directors to mitigate ripples in accordance with this disclosure.
Figure 3:
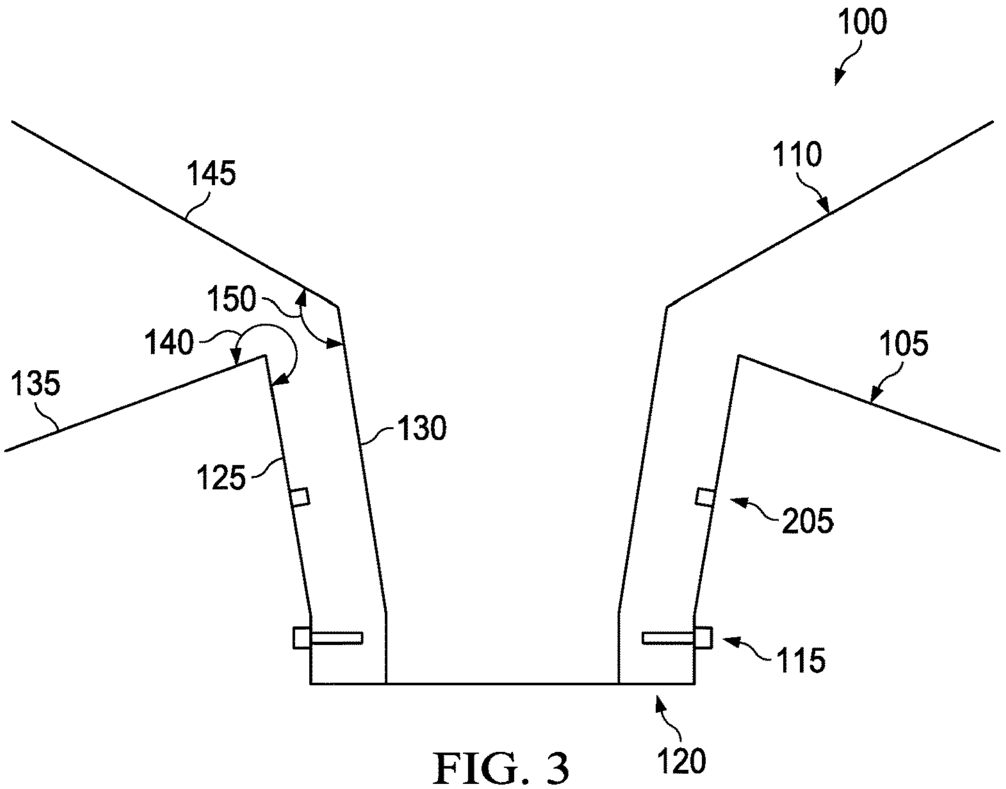
FIG. 3 illustrates an example cross-section of the geodesic antenna of FIG. 1 in accordance with this disclosure.
Figure 4:
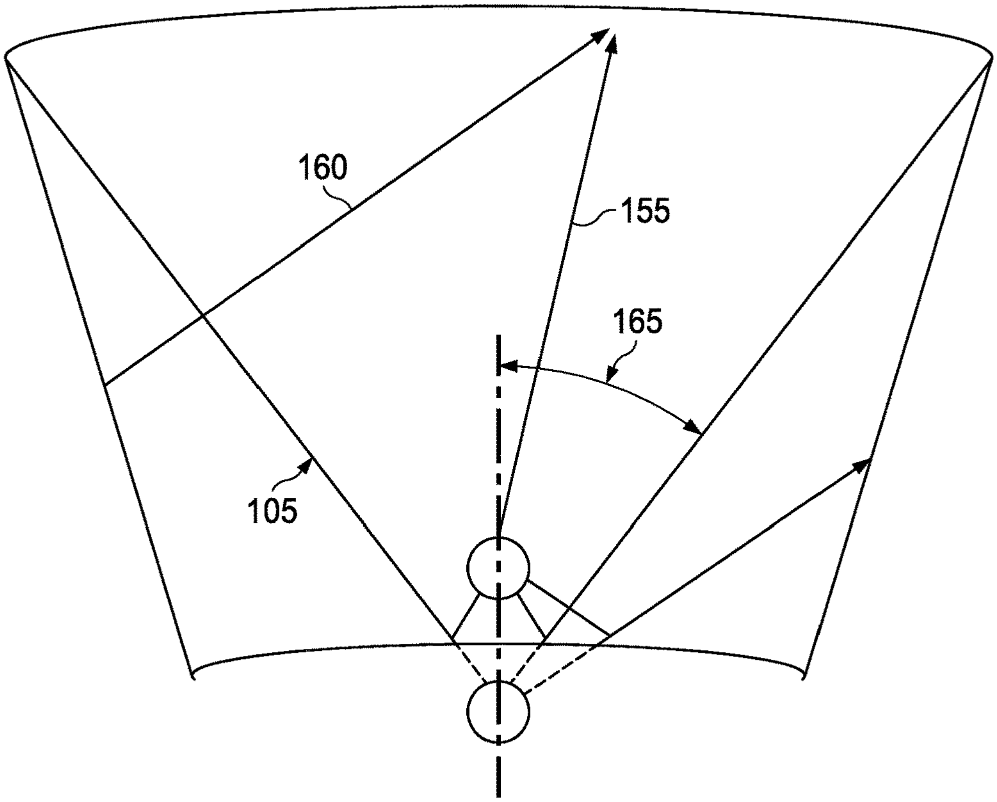
FIG. 4 illustrates an example unwrapped outer cone of the geodesic antenna of FIG. 2 displayed in two dimensions in accordance with this disclosure.

FIGS. 1 through 4 illustrate an example geodesic antenna 100 in accordance with this disclosure. In particular, FIG. 1 illustrates a side view of the geodesic antenna 100, FIG. 2 illustrates an isolated portion of the geodesic antenna 100, FIG. 3 illustrates a cross-section of the geodesic antenna 100 of FIG. 1, and FIG. 4 illustrates an unwrapped outer cone of the geodesic antenna 100 of FIG. 2. The embodiment of the geodesic antenna 100 in FIGS. 1 through 4 is for illustration only, and a geodesic antenna 100 may have any other suitable element pattern.

As shown in FIGS. 1 through 4, the geodesic antenna 100 is formed using nested geodesic lens antennas (GLAs), which are referred to as "cones." In the illustrative embodiment of FIGS. 1 through 4, the geodesic antenna 100 includes an outer cone 105 and an inner cone 110. The outer cone 105 and the inner cone 110 are concentric to act as a parallel plate waveguide. While more than two cones can be used in the geodesic antenna 100, the relationship between the outer cone 105 and the inner cone 110 will be described for simplicity, and the relationship between the outer cone 105 and the inner cone 110 can be extended for more than two cones. For example, an additional outer cone may be concentric with the inner cone 110 and with the outer cone 105 to act as a parallel plate waveguide.

The outer cone 105 represents a base of the geodesic antenna 100. The outer cone 105 can be formed from any suitable conductive material(s), such as one or more metals. The outer cone 105 can also be formed in any suitable manner, such as casting or injection molding. In addition, the outer cone 105 can have any suitable size, shape, and dimensions. In this example, the outer cone 105 is formed as a hollow cylinder that is covered on one side, which forms the base of the outer cone 105. The circumference of an opposite side of the cylinder from the base has a flared portion 135 protruding away in a radial direction from a central axis of the outer cone 105. A surface of the flared portion 135 is at a reflex angle (greater than 180°) from an inside surface 125 of the outer cone 105.

The inner cone 110 is inserted into and coupled with the outer cone 105. The inner cone 110 can be formed from any suitable conductive material(s), such as one or more metals. The conductive material(s) of the inner cone 110 can be the same as or different from the conductive material(s) of the outer cone 105. The inner cone 110 can also be formed in any suitable manner, such as casting or injection molding. In addition, the inner cone 110 can have any suitable size, shape, and dimensions. In this example, the inner cone 110 is formed as a hollow cylinder, where an exterior base of the inner cone 110 is coupled to an interior base of the outer cone 105 such that the inner cone 110 extends from an interior of the outer cone 105. Note that while both the inner cone 110 and the outer cone 105 are described as having the same shape (a hollow cylinder), the shapes of the outer cone 105 and the inner cone 110 can be different.

Depending on the implementation, the inner cone 110 can share a base with the outer cone 105, or the inner cone 110 can be covered on one side to form a base of the inner cone 110 (where the base of the inner cone 110 is coupled directly or indirectly to the base of the outer cone 105). Coupling the inner cone 110 to the outer cone 105 forms an annulus between the inside surface 125 of the outer cone 105 and an outside surface 130 of the inner cone 110. A length of the inner cone 110 can extend past a top edge of the outer cone 105. The circumference of an opposite side of the inner cone 110 from the base of the inner cone 110 has a flared portion 145 protruding away in a radial direction from a central axis of the inner cone 110. A surface of the flared portion 145 is at an acute or obtuse angle 150 from the outside surface 130 of the inner cone 110.

The outer cone 105 and the inner cone 110 make a geodesic parallel plate waveguide as conformal structures, such as a pair of conic sections. The inner cone 110 is coupled within the outer cone 105 to form the parallel waveguide, which is formed between the inside surface 125 of the outer cone 105 and the outside surface 130 of the inner cone 110. The inside surface 125 of the outer cone 105 and the outside surface 130 of the inner cone 110 represent opposing plates of the waveguide.

The outer cone 105 includes the flared portion 135, which can extend at a reflex angle 140 from the top of the inside surface 125 of the outer cone 105. The inner cone 110 includes the flared portion 145, which can extend at an acute angle or obtuse angle 150 from the top of the outside surface 130 of the inner cone 110. The flared portion 135 of the outer cone 105 and the flared portion 145 of the inner cone 110 can focus a resulting waveguide radiation element pattern. The structure of the flared portions 135 and 145 allows for omnidirectional waveguide radiation element patterns.

Each of multiple driven elements 115 is connected to a transmitter or receiver, such as by using a transmission line. When a driven element 115 is implemented in a transmitting geodesic antenna 100, the driven element 115 is driven by a radio frequency (RF) signal from the transmitter. When a driven element 115 is implemented in a receiving geodesic antenna 100, the driven element 115 converts collected RF waves into electrical currents, which are provided to the receiver. Each of the driven elements 115 may represent a quarter-wavelength feed probe or other feed probe.

At least one driven element 115 may be configured to generate a primary ray 155. The primary ray 155 from the driven element 115 is generally focused out of the outer cone 105, but secondary rays 160 can be generated as a side effect of the primary ray 155 interacting with the outside surface 130 the inner cone 110 and the inside surface 125 of the outer cone 105 and can also be generated based on a general dispersion of a beam. At least one driven element 115 may function as a monopole and also generate a ray in the opposite direction towards reflectors 120.

The reflectors 120 reflect electromagnetic waves from the driven elements 115, and the reflected electromagnetic waves increase the gain of the primary ray 155. The reflectors 120 are placed a distance of a quarter wave from the driven element at the base in the interior of the outer cone 105. The reflectors 120 are electromagnetically coupled with the driven element 115. As shown in FIG. 4, the primary ray 155 from each driven element 115 contributes to the pointing angle within a scan angle 165. The primary rays 155 generate an element pattern suitable for the specific use of the geodesic antenna 100.

Without any type of correction, the secondary rays 160 (or geodesic rays) can wrap around between the inner cone 130 and the outer cone 125 and interfere with both the primary rays 155 and other secondary rays 160 thus creating a ripple in the element pattern. This ripple creates ambiguity in the phase response of the antenna 100, which (among other things) can affect beam steering calculations or other calculations. This ripple effect also generates higher-side lobes when forming a beam. Minimizing the secondary rays 160 may be necessary or desirable since the secondary rays 160 wrap around the inner 130 and outer 125 cones and destructively interfere with the primary ray 155.

The inner cone 130 and the outer cone 125 can be designed with a scan angle 165 that affects the gain and size of the antenna 100. A smaller scan angle 165 provides more gain but may also necessitate a taller antenna. A larger scan angle 165 provides less gain but allows for a smaller, compact antenna.

As shown in FIGS. 2 and 3, the geodesic antenna 100 includes multiple driven elements 115, multiple directors 205, and reflector 120. The use of directors 205 in the geodesic antenna 100 reduces the secondary rays 160, which as described above cause a ripple effect. While a single outer cone 105 is shown here, the geodesic antenna 100 can include any number of outer cones 105, and each additional outer cone 105 can include additional driven elements 115, additional directors 205, and additional reflectors 120.

The directors 205 acts as a resonator to direct the primary ray 155 out of the geodesic antenna 100 and reduces generation of secondary rays 160. In directing the primary ray 155, the directors 205 enhance a gain of a beam, which makes the beam sharper. The directors 205 are passive elements in that they are not connected to a transmitter or receiver. The directors 205 are also parasitic elements that are electromagnetically coupled with the corresponding driven elements 115.

In some embodiments, each director 205 can be a Yagi director element that reduces ripple in a single element gain and phase pattern. Each director 205 creates a natural element taper, which reduces sides lobes when forming a beam. Each director 205 can be formed from any suitable conductive material(s), such as one or more metals. Each director 205 can also be formed in any suitable manner. In addition, each director 205 can have any suitable size, shape, and dimensions. In some embodiments, each director 205 is formed in a rod shape. Also, each director 205 may typically be shorter in length than its corresponding driven element 115.

The directors 205 can be aligned with the driven elements 115 to properly focus the primary ray 155 and reduce the secondary rays 160. The geodesic antenna 100 can be designed with a single director 205 for each driven element 115 or multiple directors 205 for each driven element 115. When multiple directors 205 are used for each driven element 115 in the geodesic antenna 100, a spacing between directors 205 can vary, such as between 1/10 and 4/10 of a wavelength for the beam. The gain increase from the directors 205 can be additive for each additional director 205. While a gain of a beam increases based on additional directors 205, a bandwidth of the beam is narrowed.

Figure 6:
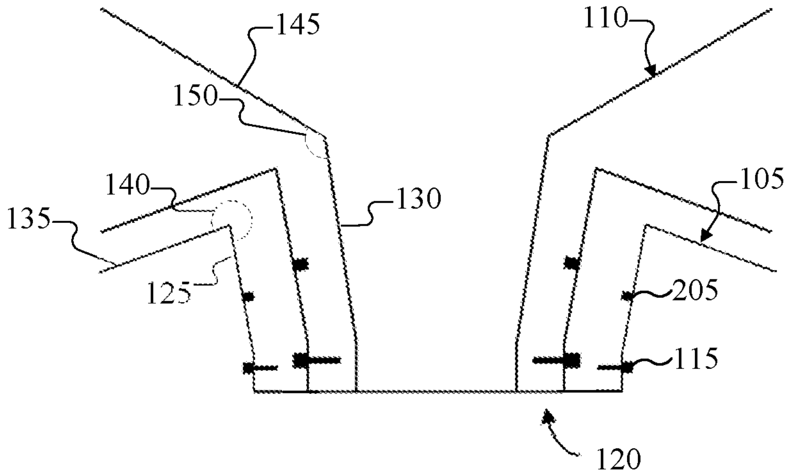
FIG. 6 illustrates an example cross-section of a geodesic antenna with multiple outer cones in accordance with this disclosure.

Although FIG. 1 through 4 illustrate one example of a geodesic antenna 100, various changes may be made to FIGS. 1 through 4. For example, the geodesic antenna 100 may have multiple outer cones 105, each with driven elements 115 and directors 205 as shown in FIG. 6 and be used in conjunction with any suitable number(s) and type(s) of components and systems.

Figure 5A:
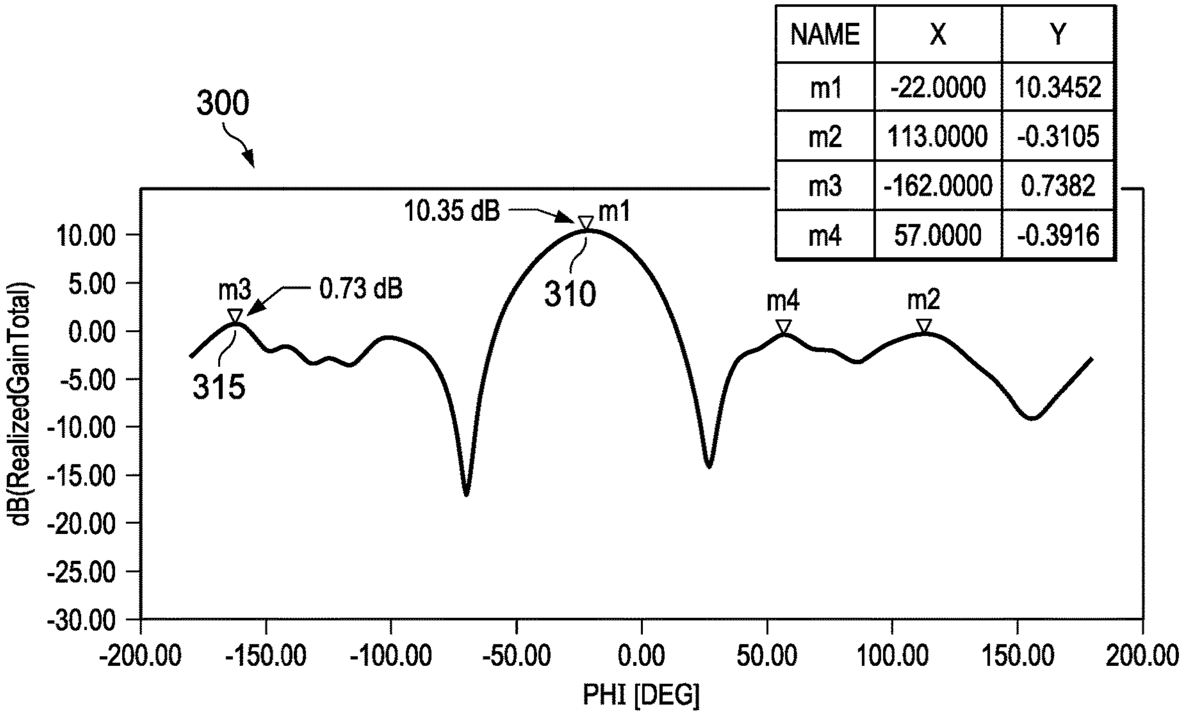
FIGS. 5A through 5D illustrate example beam patterns and element patterns for geodesic antennas with directors and without directors in accordance with this disclosure.
Figure 5B:
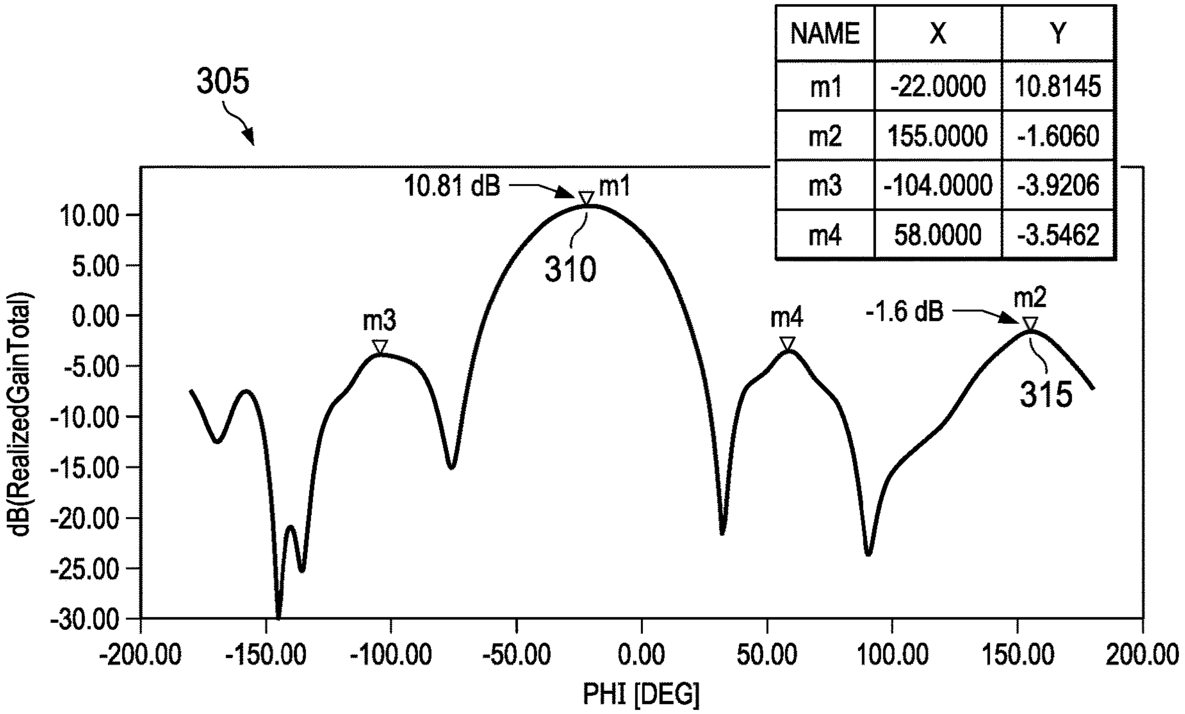
Figure 5C:
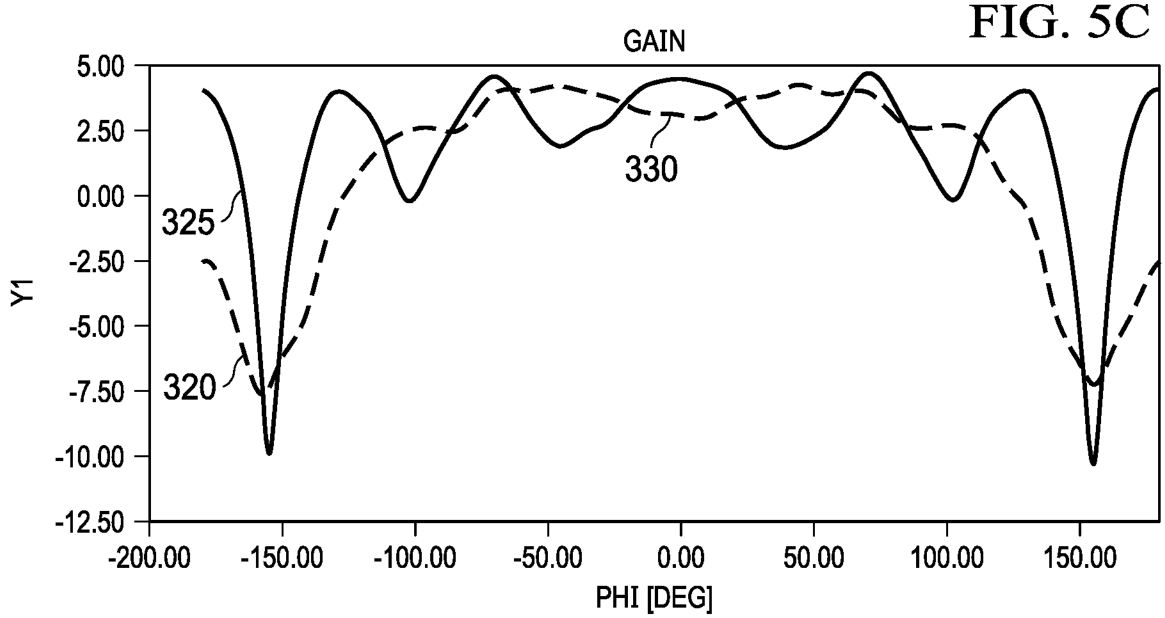
Figure 5D:
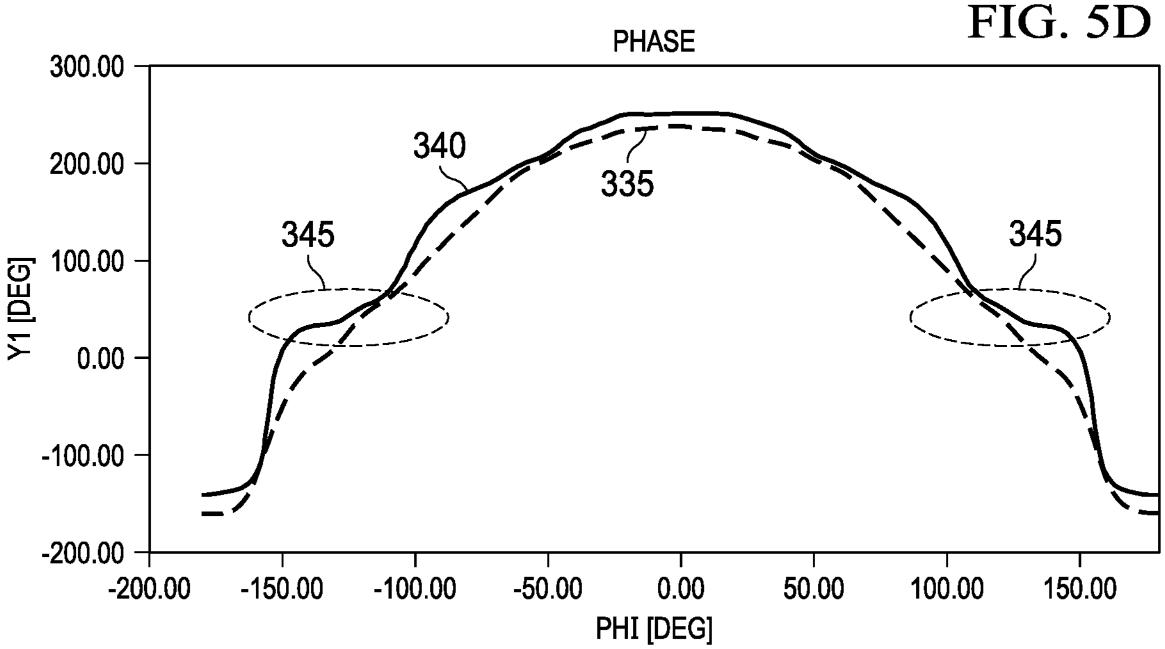

FIGS. 5A through 5D illustrate example beam patterns and element patterns for geodesic antennas with directors and without directors in accordance with this disclosure. In particular, FIG. 5A illustrates a regular beam pattern 300 of a geodesic antenna, FIG. 5B illustrates a directed beam pattern 305 of the geodesic antenna 100, FIG. 5C illustrates element gain patterns 320 and 325, and FIG. 5D illustrates an element cumulative phase patterns 335 and 340. The embodiments of the beam patterns in FIGS. 5A through 5D are for illustration only, and the geodesic antenna 100 may generate any suitable beam pattern.

As shown in FIG. 5A, the regular beam pattern 300 is generated from a geodesic antenna without any directors 205. The regular beam pattern 300 includes a peak 310 and multiple side lobes 315. The peak 310 is the desired effect of the beam created from the primary ray 155. The side lobes 315 are indications of ripples or interference of the primary ray 155 by the secondary rays 160.

As shown in FIG. 5B, the directed beam pattern 305 is generated from the geodesic antenna 100 of FIGS. 1 through 4. The directed beam pattern 305 includes a similar peak 310, while the side lobes 315 are much less noticeable. The use of the directors 205 reduces the amplitudes of the side lobes 315 considerably. This is evident in this example by the amplitude of the side lobes 315 at 0.73 dB in the regular beam pattern 300 and at −1.6 dB in the directed beam pattern 305.

As shown in FIG. 5C, the element gain patterns 320 and 325 are generated from a geodesic antenna. The directed element gain pattern 320 is generated from the geodesic antenna 100 of FIGS. 1 through 4. The directed element gain pattern 320 includes a flatter gain 330 and natural taper compared to the regular gain pattern. The flatter gain 330 leads to a more predictable response.

As shown in FIG. 5D, the element cumulative phase patterns 335 and 340 are generated from a geodesic antenna. The directed element cumulative phase pattern 335 is generated from the geodesic antenna 100 of FIGS. 1 through 4. The directed element cumulative phase pattern 335 has a smoother phase response than the regular element cumulative phase pattern 340, which leads to a more predictable response. The regular element cumulative phase pattern 340 also includes flat regions 345 that create phase ambiguities, which leads to a less predictable response.

Although FIG. 5A through 5D illustrate examples of beam patterns 300 and 305 and element patterns 320, 325, 335, and 340 for geodesic antennas without directors and with directors 205, various changes may be made to FIGS. 5A through 5D. For example, the beam patterns 300 and 305 of FIGS. 5A and 5B can vary based on the designs of the geodesic antennas.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:

an inner cone;

an outer cone coupled to the inner cone;

at least one driven element coupled to the outer cone and configured to transmit at least one primary ray into a space between the inner cone and the outer cone; and at least one director coupled to the outer cone and configured to direct the at least one primary ray within the space between the inner cone and the outer cone.

2. The apparatus of claim 1, wherein the inner cone and the outer cone are concentric.

3. The apparatus of claim 1, wherein the at least one driven element comprises multiple driven elements.

4. The apparatus of claim 1, wherein the at least one director comprises multiple directors.

5. The apparatus of claim 1, wherein a number of directors is equal to a number of driven elements.

6. The apparatus of claim 1, wherein one of the at least one director is configured to direct a primary ray for each of the at least one driven element.

7. The apparatus of claim 1, wherein multiple directors are configured to direct a primary ray for each of the at least one driven element.

8. The apparatus of claim 1, wherein the at least one director is configured to act as at least one resonator to direct the at least one primary ray out of a geodesic antenna and to reduce generation of secondary rays.

9. An apparatus comprising:

an inner cone;

a first outer cone coupled to the inner cone;

a second outer cone coupled to the first outer cone;

at least one driven element coupled to the second outer cone and configured to transmit at least one primary ray into a space between the first outer cone and the second outer cone; and at least one director coupled to the second outer cone and configured to direct the at least one primary ray within the space between the first outer cone and the second outer cone.

10. The apparatus of claim 9, wherein the first outer cone and the second outer cone are concentric.

11. The apparatus of claim 9, wherein the at least one driven element comprises multiple driven elements.

12. The apparatus of claim 9, wherein the at least one director comprises multiple directors.

13. The apparatus of claim 9, wherein a number of directors is equal to a number of driven elements.

14. The apparatus of claim 9, wherein one of the at least one director is configured to direct a primary ray for each of the at least one driven element.

15. The apparatus of claim 9, wherein multiple directors are configured to direct a primary ray for each of the at least one driven element.

16. The apparatus of claim 9, wherein the at least one director is configured to act as at least one resonator to direct the at least one primary ray out of a geodesic antenna and to reduce generation of secondary rays.

17. An apparatus comprising:

an inner cone;

a first outer cone coupled to the inner cone;

at least one first driven element coupled to the first outer cone and configured to transmit at least one first primary ray into a space between the inner cone and the first outer cone;

at least one first director coupled to the first outer cone and configured to direct the at least one first primary ray within the space between the inner cone and the first outer cone;

a second outer cone coupled to the first outer cone;

at least one second driven element coupled to the second outer cone and configured to transmit at least one second primary ray; and at least one second director coupled to the second outer cone and configured to direct the at least one second primary ray.

18. The apparatus of claim 17, wherein the inner cone, the first outer cone, and the second outer cone are concentric.

19. The apparatus of claim 17, wherein:

the at least one first driven element comprises multiple first driven elements; and the at least one second driven element comprises multiple second driven elements.

20. The apparatus of claim 17, wherein:

the at least one first director comprises multiple first directors; and the at least one second director comprises multiple second directors.

21. The apparatus of claim 17, wherein:

a number of first directors is equal to a number of first driven elements; and a number of second directors is equal to a number of second driven elements.

22. The apparatus of claim 17, wherein:

one of the at least one first director is configured to direct a first primary ray for each of the at least one first driven element; and one of the at least one second director is configured to direct a second primary ray for each of the at least one second driven element.

23. The apparatus of claim 17, wherein:

multiple first directors are configured to direct a first primary ray for each of the at least one first driven element; and multiple second directors are configured to direct a second primary ray for each of the at least one second driven element.

24. The apparatus of claim 17, wherein at least one of the first and second directors is configured to act as at least one resonator to direct at least one of the first and second primary rays out of a geodesic antenna and to reduce generation of secondary rays.

* * * * *